Feb. 27, 1923.

L. C. McCHAIN,
FARM GATE.
FILED JAN. 12, 1922.

1,446,575.

Louis C. McChain, Inventor

By _____, Attorney

Patented Feb. 27, 1923.

1,446,575

UNITED STATES PATENT OFFICE.

LOUIS C. McCHAIN, OF FINLEYVILLE, PENNSYLVANIA.

FARM GATE.

Application filed January 12, 1922. Serial No. 528,811.

*To all whom it may concern:*

Be it known that I, LOUIS C. McCHAIN, a citizen of the United States, residing at Finleyville, in the county of Washington and State of Pennsylvania, have invented certain new and useful Improvements in Farm Gates; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to farm gates. It has for its object to provide a gate which can be adjusted to have its lowermost rail to stand horizontally, or at an inclination forwardly or rearwardly, so as to provide for a substantially uniform distance or space between the bottom of the gate and the ground, whether the ground be substantially level or be an up or down grade, and in which the rails may be securely locked in their adjustment by a bolt or bar which will also serve as a brace for the gate.

To the accomplishment of the foregoing and such other objects as may hereinafter appear the invention consists in the features hereinafter particularly described and then sought to be clearly defined by the claims, reference being had to the accompanying drawing forming a part thereof, and in which Figure 1 is a front elevation of the gate with the invention applied, one adjustment of the gate being shown in dotted lines;

Figure 1:
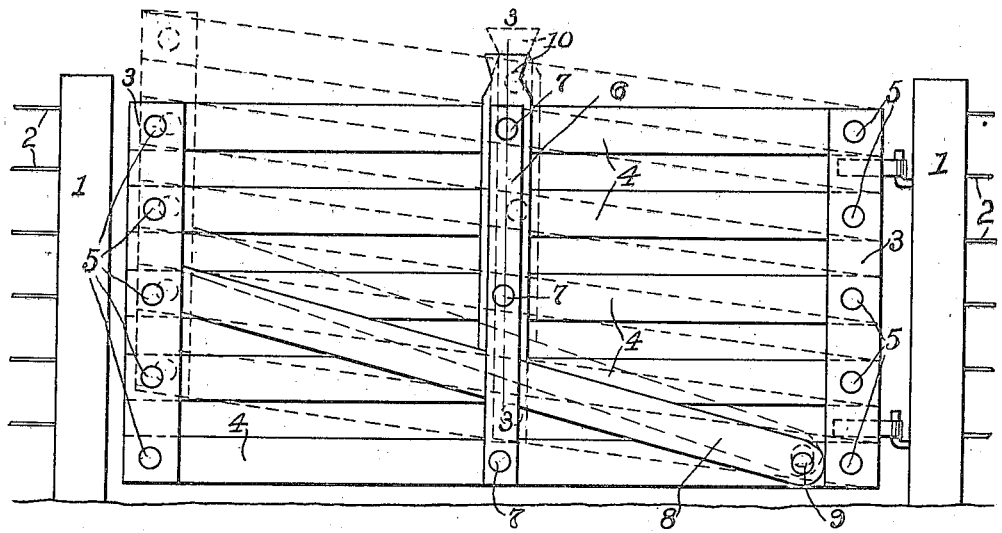
Figure 2:
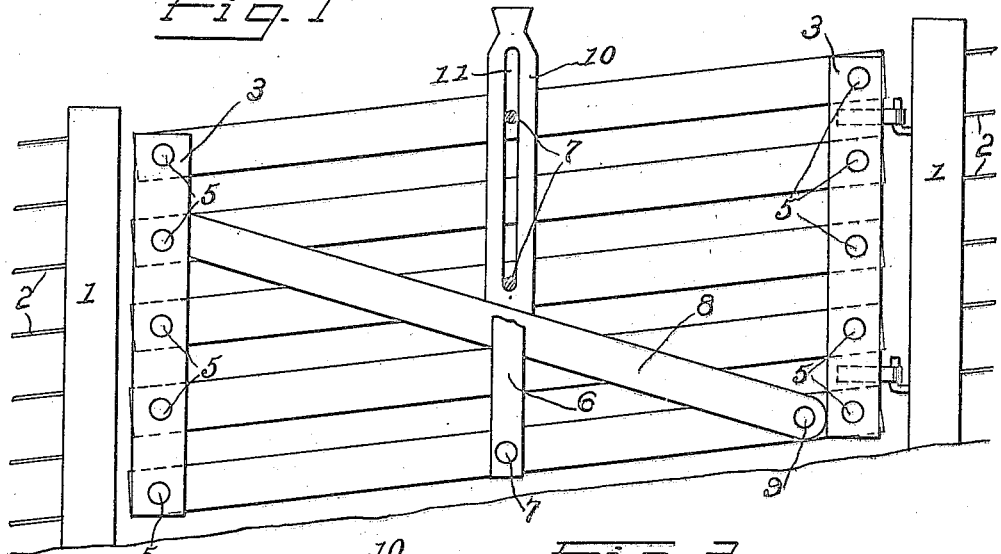
Figure 2 is a similar view showing another adjustment of the gate, with one of the vertical bars broken away to more clearly show the locking bolt or bar.
Figure 3:
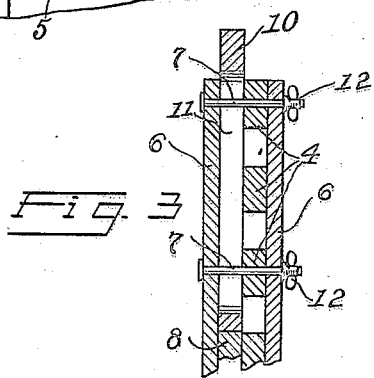
Figure 3 is a vertical section on the line 3—3 of Figure 1.

In the drawing the numeral 1 designates the gate posts and 2 wire fence strands. The gate is composed of vertical end bars 3 to which the ends of panels or rails 4 are pivotally attached by bolts or pins 5, and a central vertical bar 6 to which the rails 4 are pivotally connected by pins or bolts 7; and a diagonally extending brace bar 8 pivotally connected to a suitable part of the gate at one end, say by pivot bolt 9, and adapted to have its other end bear against the vertical bar 3 at the opposite end of the gate at various points in its length according to the adjustment of the gate to stand horizontally in relation to substantially level ground, or at an upward inclination towards its free end for upgrade or at a downward inclination for a down grade disposition or relation of the ground. The horizontal disposition of the gate is indicated by full lines, and the upgrade inclination by dotted lines, in Figure 1 of the drawing, and the down grade inclination being shown by full lines in Figure 2 of the drawing. It is preferred to make each vertical bar of the gate out of two parallel members, spaced apart, as shown in Figure 3, so that the panels or rails may fit between the two members.

The angle at which the brace bar 8 will stand in relation to panels or rails and the point at which its end will bear against the vertical end bar of the gate depends on the adjustment given to the gate, and to lock or hold the brace bar to the adjustment given there is provided a slidable locking bar 10 placed between the central vertical bar 6 and the panels or rails 4 and formed with a slot 11 through which will pass one or more, preferably two, of the pivoting bolts 7, so that by adjusting the locking bar to cause its lower end to bear on the brace bar and then tightening thumb nuts 12 on the bolts the locking bar will be clamped in place and the brace bar kept from shifting from its position, and thus the gate is held rigidly in the position to which it has been adjusted for upgrade or down grade or level disposition of the land and thus substantially the same distance between the ground and the bottom of the gate obtained under the different conditions named. This locking bar also tends to stiffen and brace the gate. The construction is comparatively inexpensive, the adjustment is readily effected, and stability and durability as a whole is given to the gate by the construction described.

While I have illustrated and described with particularity the preferred details of the several parts, changes can be made and essential features retained.

Having described my invention and set forth its merits what I claim is:

1. A farm gate consisting of vertical end bars, rails pivotally connected at their ends to the end bars, a brace-bar pivotally connected at one end to a part of the gate and adapted to have its other end bear against one of the vertical end bars in vertical adjustments of the gate, a slidable locking bar disposed to have one end bear against the upper edge of the brace-bar to secure the parts in their adjustment, and means for clamping the slidable locking bar in its various vertical adjustments.

2. A farm gate consisting of vertical end bars and an intermediate vertical bar, rails pivotally connected to the intermediate and end bars, a brace-bar pivotally connected at one end to a part of the gate and adapted to have its other end bear against one of the vertical end bars in adjustments of the gate, a slotted slidable locking bar disposed between the rails and an intermediate vertical guide bar, and adapted to have one end bear against the brace-bar, bolts passing through the intermediate bar, the guide bar and the slot of the slidable bar and provided with means for clamping the locking bar in its various adjustments.

In testimony whereof I affix my signature in presence of two witnesses.

LOUIS C. McCHAIN.

Witnesses:
J. I. HUSLER,
O. F. TROUTMAN.